(12) United States Patent
Blattert et al.

(10) Patent No.: US 8,483,923 B2
(45) Date of Patent: Jul. 9, 2013

(54) METHOD FOR REDUCING THE CLAMPING FORCE APPLIED BY A PARKING BRAKE

(75) Inventors: Dieter Blattert, Kirchheim/Neckar (DE); Simon Hauber, Freiberg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/421,690

(22) Filed: Mar. 15, 2012

(65) Prior Publication Data
US 2012/0245816 A1    Sep. 27, 2012

(30) Foreign Application Priority Data
Mar. 21, 2011  (DE) .......................... 10 2011 005 843

(51) Int. Cl.
G06F 7/70      (2006.01)
G06F 19/00     (2006.01)
G06G 7/00      (2006.01)
G06G 7/76      (2006.01)

(52) U.S. Cl.
USPC ........................................................ 701/70

(58) Field of Classification Search
USPC .......................................................... 701/70
See application file for complete search history.

(56) References Cited

U.S. PATENT DOCUMENTS

| | | | | |
|---|---|---|---|---|
| 5,442,553 A * | 8/1995 | Parrillo | .................. | 455/420 |
| 5,781,125 A * | 7/1998 | Godau et al. | ............. | 340/870.01 |
| 6,047,234 A * | 4/2000 | Cherveny et al. | ............. | 701/451 |
| 6,055,468 A * | 4/2000 | Kaman et al. | .................... | 701/99 |
| 6,330,499 B1 * | 12/2001 | Chou et al. | .................... | 701/31.4 |
| 6,339,736 B1 * | 1/2002 | Moskowitz et al. | ......... | 701/32.7 |
| 6,438,471 B1 * | 8/2002 | Katagishi et al. | ............ | 701/31.4 |
| 6,542,794 B2 * | 4/2003 | Obradovich | ....................... | 701/1 |
| 6,549,833 B2 * | 4/2003 | Katagishi et al. | ............ | 701/31.6 |
| 6,577,928 B2 * | 6/2003 | Obradovich | ..................... | 701/1 |
| 6,609,595 B2 * | 8/2003 | Flynn et al. | .................... | 188/156 |
| 6,735,504 B2 * | 5/2004 | Katagishi et al. | ............ | 701/31.6 |
| 7,054,822 B2 * | 5/2006 | McCall | ......................... | 705/7.15 |
| 7,142,844 B2 * | 11/2006 | Obradovich et al. | ....... | 455/414.1 |
| 7,171,291 B2 * | 1/2007 | Obradovich | .................. | 701/29.4 |
| 7,227,324 B2 | 6/2007 | Erben et al. | | |
| 7,409,275 B2 * | 8/2008 | Sakurai et al. | ................ | 701/29.1 |
| 7,877,206 B2 * | 1/2011 | Cabral et al. | ................... | 701/414 |
| 7,992,691 B2 * | 8/2011 | Maron et al. | ................... | 188/156 |
| 8,041,779 B2 * | 10/2011 | Habaguchi et al. | ........... | 709/219 |
| 8,204,688 B2 * | 6/2012 | Cabral et al. | ................... | 701/533 |
| 2003/0033073 A1 * | 2/2003 | Kichima et al. | ................ | 701/96 |
| 2004/0153356 A1 * | 8/2004 | Lockwood et al. | ................ | 705/9 |
| 2008/0053760 A1 * | 3/2008 | Oikawa et al. | ................ | 188/72.4 |
| 2009/0048944 A1 * | 2/2009 | Eagle | ............................... | 705/27 |
| 2009/0222161 A1 * | 9/2009 | Tsai et al. | ......................... | 701/30 |
| 2011/0278105 A1 * | 11/2011 | Maron et al. | .................. | 188/72.1 |

FOREIGN PATENT DOCUMENTS
DE    10361042    5/2005

* cited by examiner

Primary Examiner — Mary Cheung
Assistant Examiner — Frederick Brushaber
(74) Attorney, Agent, or Firm — Kenyon & Kenyon LLP

(57) ABSTRACT

In a method for reducing the clamping force applied by a parking brake, which may be generated at least partially by an electromechanical brake device having an electric brake motor and supplemented if necessary by a hydraulic brake device, a signal is generated for actuating the hydraulic brake device for the case that it is not possible for the brake motor to be released for reducing the clamping force.

16 Claims, 2 Drawing Sheets

METHOD FOR REDUCING THE CLAMPING FORCE APPLIED BY A PARKING BRAKE

CROSS REFERENCE

The present application claims the benefit under 35 U.S.C. §119 of German Patent Application No. DE 102011005843.5 filed on Mar. 21, 2011, which is expressly incorporated herein by reference in its entirety.

FIELD OF THE INVENTION

The present invention relates to a method for reducing the clamping force applied by a parking brake.

BACKGROUND INFORMATION

A parking brake via which a vehicle is held at a standstill is described in German Patent Application No. DE 103 61 042 B3. The clamping force for holding the vehicle is generated electromechanically, in that an electric brake motor of the parking brake acts upon a brake piston, which is the carrier of a brake lining, axially in the direction of a brake disk. When the locking operation is completed, the position of the rotor of the brake motor is held and the clamping force is preserved. In order to be able to move the vehicle again, the clamping force must be reduced, for which purpose the brake motor is displaced in the opposite direction.

SUMMARY

An object of the present invention is to use simple measures to ensure that an electromechanical parking brake may be released in different operating conditions.

An example method according to the present invention refers to an electromechanical parking brake in a vehicle having an electric brake motor via which it is possible to generate a clamping force holding the vehicle. When the brake motor is actuated, the rotational movement of the rotor of the brake motor is transferred to an axial actuating motion of a final controlling element, via which a brake piston, which is the carrier of a brake lining, is pressed axially against a brake disk. The parking brake is additionally provided with a hydraulic brake device, via which a hydraulic clamping force is generatable additionally and if necessary. Via the hydraulic brake device, which is in particular the regular hydraulic vehicle brake of the vehicle, a hydraulic pressure is generated which acts upon the brake piston in such a way that the total clamping force is made up of one component which is generated via the electric brake motor and one component from the hydraulic brake device.

In extreme situations in which it is no longer possible to release the parking brake in a purely electromechanical manner after a clamping force has been generated, according to the present invention, a signal is generated for actuating the hydraulic brake device. This is performed both in cases of an actual blocking of the brake motor and in cases of imminent blocking. Via the signal that is generated in these cases, the hydraulic brake device may be triggered automatically, for example, by activating an ESP hydraulic system (electronic stability program). However, it is also possible to generate a signal which is displayed to the driver visually, acoustically or haptically in order to prompt him to actuate the hydraulic vehicle brake. The increase of the hydraulic pressure may cancel a blocking of the electromechanical parking brake, so that the parking brake is displaced in the desired manner in the direction of the open position, making it possible to reduce the clamping pressure. If the driver does not respond to the request for actuating the hydraulic vehicle brake, the signal may be repeated or prolonged, if necessary. The same applies for the case that the automatic generation of the hydraulic pressure or the manual actuation by the driver is not adequate to release the blocking.

The blocking may in principle be recognized either preventively or after an already completed occurrence. The preventive recognition of imminent blocking is established in particular using state or operating variables of the parking brake to be checked. In this connection, different variables may be checked, an extreme or blockade situation being present or imminent if one of the checked variables already lies outside of an admissible range of values.

The hydraulic pressure of the hydraulic brake device, which acts on the brake piston, may be checked from a preceding engagement of the parking brake as a state or operating variable of the parking brake, which is checked in order to detect an imminent blocking. If this check finds that the hydraulic brake pressure exceeds a limiting value, a blocking is imminent, so that the measures for canceling the blocking are initially taken after the parking brake has been applied and before the desired release. The hydraulic pressure from the preceding engagement of the parking brake is either produced by the driver by actuating the brake pressure (pre-pressure) or generated automatically by a final controlling element, for example, via the ESP hydraulic system.

Another criterion for establishing an extreme or blocking situation lies in the amount of the clamping force from a preceding braking operation of the parking brake. If this clamping force has been actuated by actuating the electric brake motor with maximum brake force or a brake force exceeding a limiting value, the presence of an extreme or potential blocking situation may also be assumed.

According to another criterion, an extreme or blocking situation is present or imminent if the temperature in the parking brake exceeds a limiting value. Also for the case that the parking brake is reengaged following an engagement, or the electrical voltage in the vehicle electrical system, which is available for actuating the brake motor, falls below a limiting value, an actual or imminent blocking situation may also be assumed.

A signal for starting the drive engine may be generated as an additional measure in the case that it is not possible to release the brake motor for reducing the clamping force. The signal is displayed to the driver in a suitable manner in order to prompt him to start the drive engine. If necessary, the drive engine may also be started automatically.

An actual blocking situation may be recognized by investigating motor variables of the electric brake motor. If a release process is started by activating the brake motor, in which the motor current exceeds a limiting value, a motor blocking may be assumed, and the release process is discontinued again. The same applies if the motor speed falls below a limiting value; in this case also, a blocking of the electric brake motor is present which results in a discontinuation of the release process or the activation of the brake motor and following which one of the above-named measures is taken to cancel the blocking.

The example method according to the present invention runs in a regulating and control unit in the vehicle, which may be an integral part of the parking brake system.

Additional advantages and advantageous designs may be derived from the description below and the figures.

DETAILED DESCRIPTION OF EXAMPLE EMBODIMENTS

Figure 1:
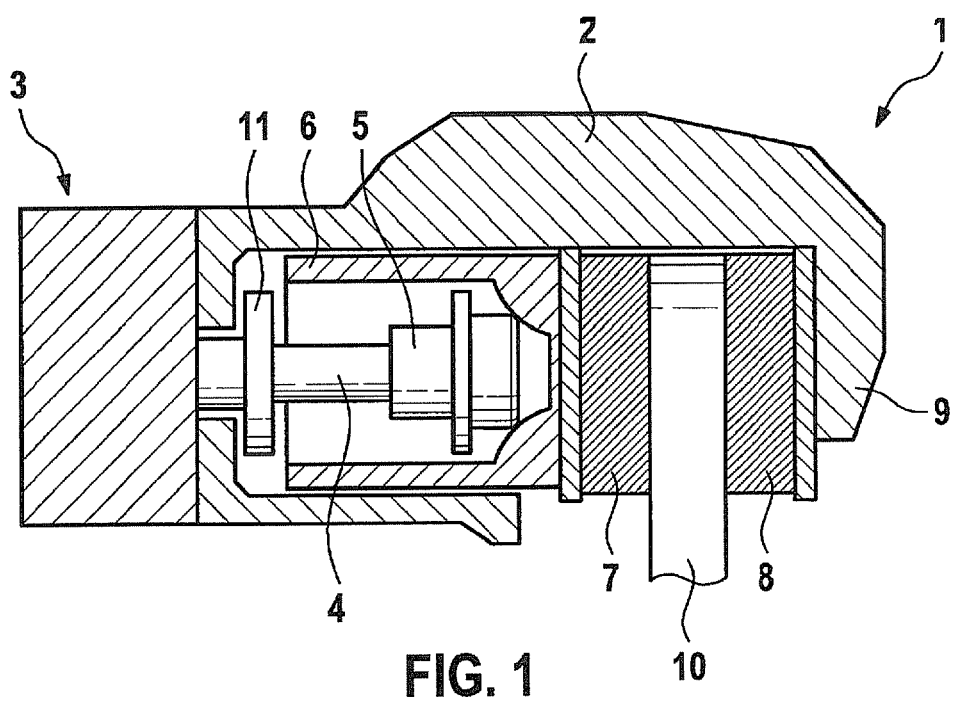
FIG. 1 shows a section through an electromechanical parking brake for a vehicle, in which the clamping force is generated via an electric brake motor.

An electromechanical parking brake 1 for holding a vehicle at a standstill is shown in FIG. 1. Parking brake 1 includes a brake caliper 2 having a caliper unit 9 which reaches over brake disk 10. As a final controlling element, parking brake 1 has an electric motor as brake motor 3 which rotatingly drives a spindle 4, on which a spindle component 5 designed as a spindle nut is rotatably supported. When spindle 4 is rotated, spindle component 5 is displaced axially. Spindle component 5 moves within a brake piston 6, which is a carrier of a brake lining 7 which is pressed by brake piston 6 against brake disk 10. Another brake lining 8, which is held in a fixed position on caliper unit 9, is located on the opposite side of brake disk 10.

Within brake piston 6, spindle component 5 is able to move axially forward in the direction of brake disk 10 when spindle 4 rotates, or it is able to move axially rearward until a stop 11 is reached when spindle 4 rotates in the opposite direction. In order to generate a clamping force, spindle component 5 acts upon the inner front side of brake piston 6, whereby brake piston 6, which is supported displaceably in parking brake 1, is pressed against the facing front side of brake disk 10 with its brake lining 7.

If necessary, the parking brake may be supported by a hydraulic vehicle brake, so that the clamping force is composed of an electromotoric component and a hydraulic component. In the case of hydraulic support, the back of brake piston 6 facing the brake motor is acted upon using hydraulic fluid under pressure.

Figure 2:
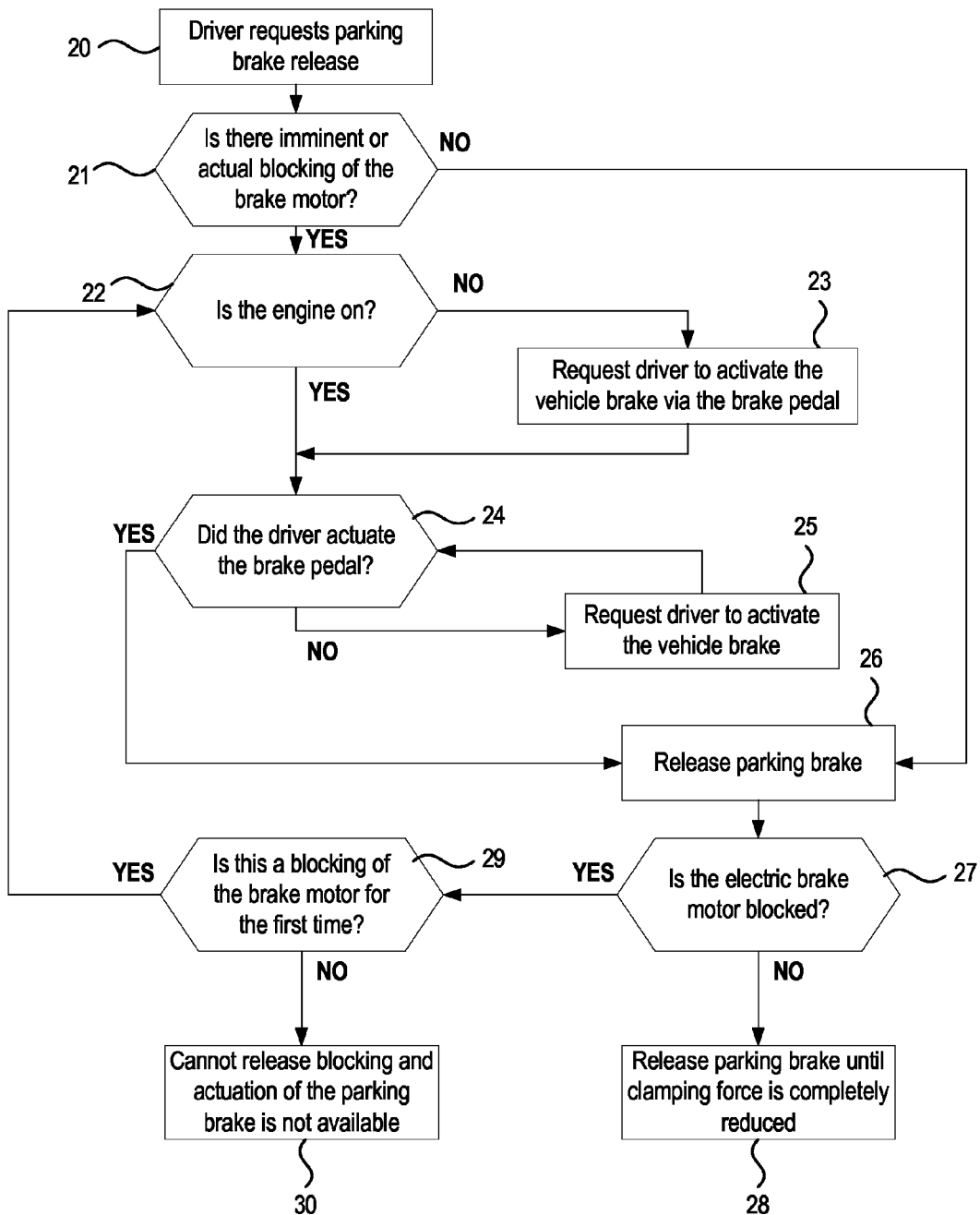
FIG. 2 shows a flow chart having method steps for reducing the clamping force applied by the parking brake if the brake motor is blocked.

FIG. 2 shows a flow chart including the individual method steps for carrying out the method for reducing the clamping force applied by a parking brake for the case of an actual or imminent blocking of the electric brake motor. In first method step 20, the driver makes the request to release the engaged parking brake. In next method step 21, a query is made as to whether an extreme situation is present in the parking brake which makes a blocking of the electric brake motor likely. This query is a preventive recognition of an extreme situation in which the different state or operating variables of the parking brake are checked for exceeding an admissible range of values. If only one of these state or operating variables exceeds or falls below the admissible range of values, it must be assumed that an extreme situation including imminent or actual blocking of the brake motor is present.

In step 21, it is queried whether the hydraulic brake device was actuated by the driver with a pre-pressure exceeding a limiting value in the preceding engagement of the parking brake. In another query in step 21, it is checked whether the parking brake was actuated with maximum brake force in the preceding engagement. Furthermore, it is queried whether the temperature in the parking brake exceeds a limiting value. Additional queries relate to the check of whether a reengagement was carried out following the engagement of the parking brake and whether the electrical voltage in the vehicle electrical system available for actuating the brake motor falls below a limiting value.

If one or several of the queries apply and thus the checked state or operating variable or parameter exceeds or falls below an admissible range of values, an actual or imminent blocking of the brake motor is present. In this case, the yes-branch ("Y") is followed to next method step 22, in which measures are taken which are intended to prevent or cancel the blocking of the brake motor. If, on the other hand, the query in method step 21 shows that none of the checked variables is outside of the admissible range of values, the no-branch ("N") is followed to method step 26, according to which the parking brake is released by actuating the electric brake motor for reducing the clamping force.

In method step 22, which is run in the case of imminent or actual blocking of the brake motor, it is checked whether the vehicle engine—usually an internal combustion engine—is switched on. If this is not the case, the no-branch is followed to method step 23, in which the driver is requested to start the engine and actuate the regular vehicle brake by pressing the brake pedal. Subsequently, the process is continued to method step 24, in which it is checked whether the driver actuates the brake pedal. Also in the case of the yes-branch in method step 22 (engine switched on), the process is continued to method step 24. If the query in method step 24 shows that the driver does not actuate the brake pedal, the no-branch is followed to method step 25 and the driver is requested to activate the vehicle brake. After that, the process is followed back to method step 24, and it is again queried whether the driver presses the brake pedal.

If the query in method step 24 shows that the driver actuates the brake pedal, the yes-branch is followed to step 26, according to which the parking brake is released for reducing the clamping force by activating the electric brake motor. Subsequently, the process is continued to method step 27, in which it is checked whether the electric brake motor is blocked, which may be detected using the curve of the motor current or the motor speed of the brake motor. A blocking of the brake motor may be present despite the preceding measures, in particular despite actuating the brake pedal. Generating a hydraulic pre-pressure via the brake pedal is intended to prevent or release a blocking; however, if it is established in the query according to method step 27 that a blocking is present despite the measure, the yes-branch is followed to method step 29. Otherwise, no blocking is present and the no-branch is followed to method step 28, according to which the parking brake is released in the desired manner until the clamping force is completely reduced.

For recognizing a blocking of the electric brake motor, it is queried in step 27 whether the motor current exceeds a limiting value. Additionally or alternatively, it may be queried whether the motor speed falls below a limiting value. If one of the conditions is fulfilled, a blocking of the brake motor is present and the yes-branch is followed to method step 29, in which an additional query is made as to whether the blocking of the brake motor was established for the first time. If this is the case, the yes-branch is followed back to method step 22 and the check or request is again made to start the vehicle engine or to actuate the brake pedal. If on the other hand, the query in step 29 shows that the blocking of the brake motor has already been established more than once, the no-branch is followed to method step 30. In this case, it is not possible to release the blocking; the actuation of the parking brake is not available.

What is claimed is:

1. A method for reducing a clamping force applied by a parking brake, which is generatable at least partially by an electromechanical brake device including an electric brake motor, the electric brake motor displacing a brake piston to which a hydraulic pressure of a hydraulic brake device is appliable, the method comprising:

determining that the electric brake motor one of is not releasable and will not be releasable for displacement of the brake piston to reduce the clamping force, wherein the determination is based on at least one operating variable of one of a previous engagement of the parking brake and the current engagement of the parking brake; and responsive to the determination, generating a signal for actuating the hydraulic brake device for reducing the clamping force.

2. The method as recited in claim 1, further comprising:
responsive to the determination, activating the hydraulic brake device via the signal.

3. The method as recited in claim 1, further comprising:
responsive to the determination, making, via the signal, a request for actuating the hydraulic brake device.

4. The method as recited in claim 1, wherein the at least one operating variable is a hydraulic pressure with which the hydraulic brake device is actuated in a previous engagement of the parking brake, the hydraulic pressure exceeding a limiting value.

5. The method as recited in claim 1, wherein the at least one operating variable is a brake force with which the parking brake is actuated in a previous engagement of the parking brake having been at a maximum.

6. The method as recited in claim 1, wherein the at least one operating variable is a temperature in the parking brake exceeding a limiting value.

7. The method as recited in claim 1, wherein the at least one operating variable is an electrical voltage falling below a limiting value in a vehicle electrical system.

8. The method as recited in claim 1, wherein the at least one operating variable is the blocking of the brake motor after an actuation for reducing the clamping force.

9. The method as recited in claim 1, wherein the at least one operating variable is a motor current exceeding a limiting value.

10. The method as recited in claim 1, wherein the at least one operating variable is a motor speed falling below a limiting value.

11. The method as recited in claim 1, wherein, in response to the determination, one of a drive engine of a vehicle is started and a request for starting the drive engine is made.

12. A method for reducing a clamping force applied by a parking brake, which is generatable at least partially by an electromechanical brake device including an electric brake motor, the electric brake motor displacing a brake piston to which a hydraulic pressure of a hydraulic brake device is appliable, the method comprising:
determining that the electric brake motor one of is not releasable and will not be releasable for displacement of the brake piston to reduce the clamping force, wherein the determination is based on a reengagement having been carried out following a previous engagement of the parking brake; and
responsive to the determination, generating a signal for actuating the hydraulic brake device for reducing the clamping force.

13. A regulating and control unit for reducing a clamping force applied to a parking brake, the clamping force being generatable at least partially by an electromechanical brake device including an electric brake motor, wherein:
the regulating and control unit is configured to generate a signal for actuating the hydraulic brake device for reducing the clamping force responsive to a determination that the electric brake motor one of is not releasable and will not be releasable for displacement of the brake piston to reduce the clamping force; and
the determination is based on at least one operating variable of one of a previous engagement of the parking brake and the current engagement of the parking brake.

14. A parking brake in a vehicle including a regulating and control unit for reducing a clamping force applied to a parking brake , the clamping force being generatable at least partially by an electromechanical brake device including an electric brake motor, wherein:
the regulating and control unit is configured to generate a signal for actuating the hydraulic brake device for reducing the clamping force responsive to a determination that the electric brake motor one of is not releasable and will not be releasable for displacement of the brake piston to reduce the clamping force; and
the determination is based on at least one operating variable of one of a previous engagement of the parking brake and the current engagement of the parking brake.

15. A method for reducing a clamping force applied by a parking brake, the clamping force being maintained at least partially by an electric brake motor of an electromechanical brake device, the electric brake motor displacing a brake piston to which a hydraulic pressure of a hydraulic brake device is appliable, the method comprising:
generating a signal for actuating the hydraulic brake device to reduce the clamping force responsive to a determination that the brake motor one of is not releasable and will not be releasable for displacement of the brake piston to reduce the clamping force.

16. A parking brake in a vehicle including a regulating and control unit for reducing a clamping force applied to a parking brake, the clamping force being maintained at least partially by an electric brake motor of an electromechanical brake device, wherein:
the regulating and control unit is configured to generate a signal for actuating the hydraulic brake device for reducing the clamping force responsive to a determination that the electric brake motor one of is not releasable and will not be releasable for displacement of the brake piston to reduce the clamping force; and
the determination is based on at least one operating variable of one of a previous engagement of the parking brake and the current engagement of the parking brake.

* * * * *